May 28, 1946.  H. T. BOOTH  2,400,911
SURGE VALVE
Filed Feb. 12, 1944  2 Sheets-Sheet 1
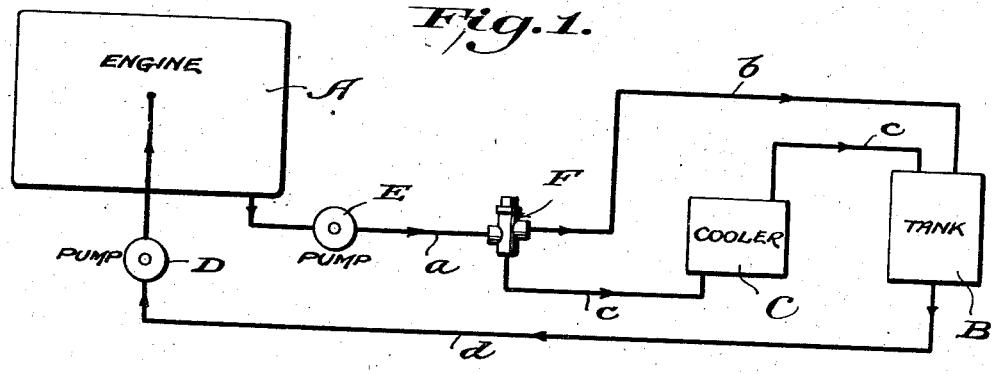
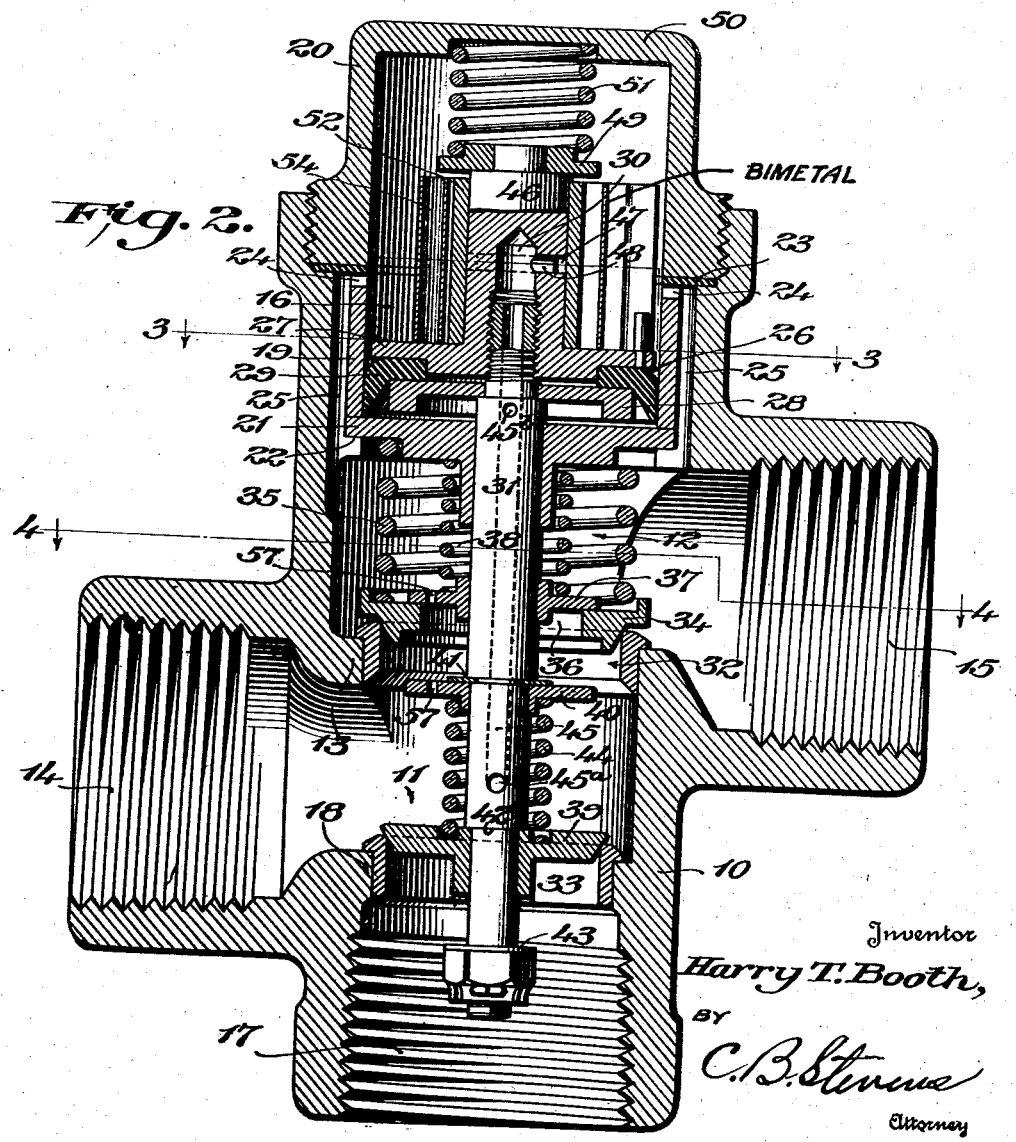
Inventor
Harry T. Booth,
By
C. B. Stevens
Attorney May 28, 1946. H. T. BOOTH 2,400,911
SURGE VALVE
Filed Feb. 12, 1944 2 Sheets-Sheet 2
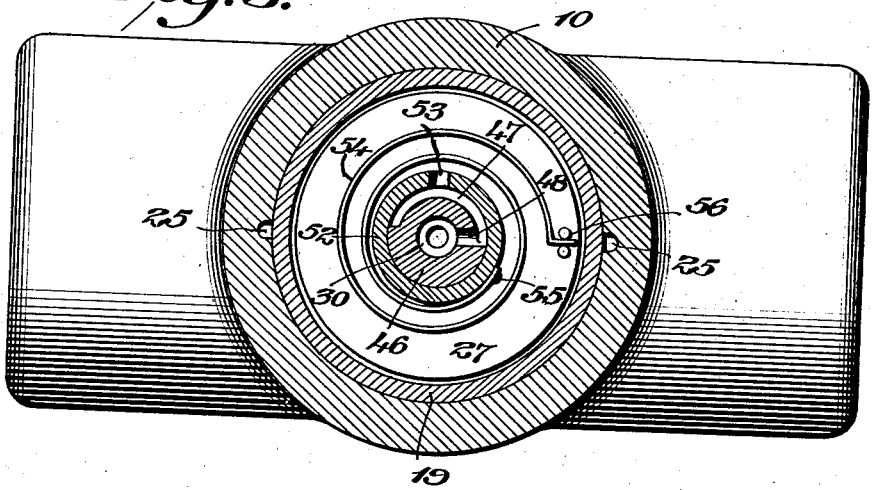
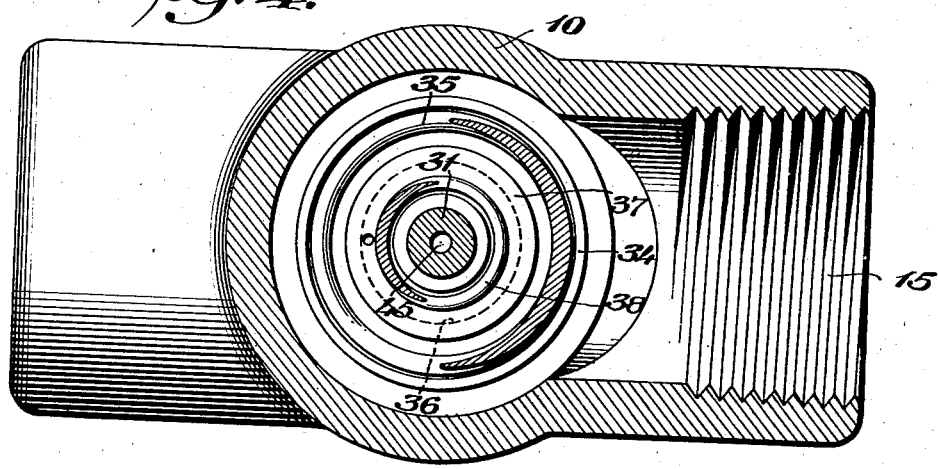
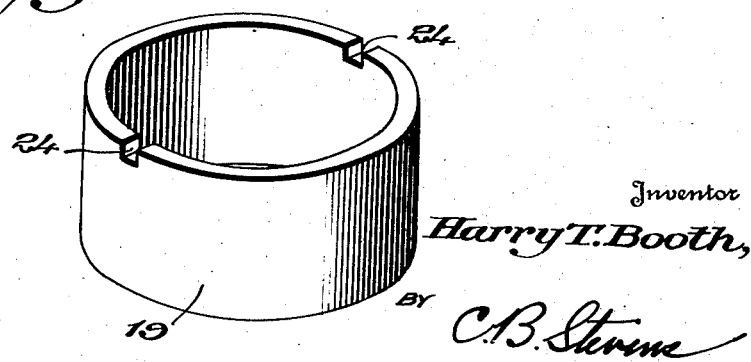
Inventor
Harry T. Booth,
By C. B. Stevens
Attorney Patented May 28, 1946

2,400,911

UNITED STATES PATENT OFFICE 2,400,911

SURGE VALVE

Harry T. Booth, Dayton, Ohio

Application February 12, 1944, Serial No. 522,136

9 Claims. (Cl. 236—34)

This invention relates to a valve device to control the path of flow of a viscous liquid, and has generally in view to provide for this purpose an improved valve device of the type described and claimed in prior Harold Cruzan applications, Serial Nos. 445,601 and 470,258, filed June 3, 1942 and December 26, 1942, respectively, which applications have matured into Patents 2,392,213 and 2,392,214, respectively, both dated Jan. 1, 1946, and Cruzan and Booth application, Serial No. 471,716, filed January 8, 1943, now Patent No. 2,391,551, dated Dec. 25, 1945.

Valve devices of the type described and claimed in said prior applications, while capable of other uses, commonly are employed in the lubricant circulating systems of aircraft and other internal combustion engines to direct the lubricant either through a cooling unit or in by-passing relationship thereto, depending upon the pressure of the lubricant, the purpose being to insure its flow through the cooling unit if it is hot and freely flowable and its pressure is not so high as to harm the cooling unit, and to insure its flow in by-passing relationship to the cooling unit if its pressure is so high as possibly to harm the cooling unit.

Heretofore, valve devices of the type under consideration have been operable to accomplish their purpose in response to pressure of the lubricant without regard to its temperature. However, at very low temperatures, the viscosity of the oil is great and the pressure thereof may differ widely at different locations in the system. Pressure differences so obtained are not a true measure of the condition of the oil. Accordingly, it is desirable to modify the operation of the valve device at low oil temperatures so that it then will direct the oil in by-passing relation to the cooling unit irrespective of variations in the pressure thereof. When the oil temperature attains a higher range, the pressure responsive mode of operation of the valve device may be restored. Accordingly, the general object of the present invention is to provide a valve device of the type referred to with means to insure that the same will not operate to direct the lubricant through the cooling unit when the temperature of the lubricant is below a predetermined value.

Another object is to incorporate in a fluid pressure responsive valve device of the class described temperature responsive means operable to suspend pressure responsive action of the device when the temperature falls below a predetermined value and to restore such action when the temperature rises above the predetermined value.

A further object of the invention is to provide a simple, practical means for the purpose stated which is incorporated in a practical, compact manner in a valve device of the type under consideration and which is thoroughly reliable, positive and efficient in its operation.

With the foregoing and other objects in view, which will become more fully apparent as the nature of the invention is better understood, the same consists in the novel features of combination and arrangement of a means for the purpose stated with a valve device of the type under consideration, and in the novel features of construction, combination and arrangement of parts of said means, as will be hereinafter more fully described, illustrated in the accompanying drawings and defined in the appended claims.

In the accompanying drawings, wherein like characters of reference denote corresponding parts in the different views:

Figure 1 is a diagrammatic view illustrating a valve device constructed in accordance with the invention incorporated in a conventional lubricant circulating system of an aircraft or other internal combustion engine.

Figure 2 is a central, vertical, longitudinal section through the valve device showing the parts thereof in the positions they assume when the engine is at rest and the lubricant is not being circulated through the system.

Fig. 3 is a horizontal section on the irregular line 3—3 of Fig. 2.

Fig. 4 is a horizontal section on the line 4—4 of Fig. 2; and

Fig. 5 is a perspective view of an element of the valve device.

Referring to the drawings in detail, first with particular reference to Fig. 1, A designates an internal combustion engine such as is used, for example, to power an aircraft, boat, land vehicle or the like; B designates a tank or reservoir for the lubricant used to lubricate the engine A; C designates a cooler for the lubricant; D designates a force pump for delivering the lubricant under pressure from the tank or reservoir B to the engine A; E designates a suction pump for effecting return flow of the lubricant from the engine A to the tank or reservoir B, and F designates, generally the present valve device for directing the lubricant, in its return flow to the tank or reservoir B, either in by-passing relationship to the cooler C or through the same, depending upon its pressure and whether it has at least some given minimum temperature.

The valve device F comprises a casing 10 having lower and upper inlet and outlet pressure chambers 11 and 12, respectively, separated by a horizontal partition wall 13, and side inlet and outlet openings 14 and 15, respectively, in constant communication with said pressure chambers 11 and 12, respectively. In addition, said casing is provided, above the upper or outlet pressure chamber 12, with a vertical cylinder 16 and, below the lower or inlet pressure chamber 11, with an outlet opening 17 separated from said lower or inlet pressure chamber by a horizontal partition wall 18.

The cylinder 16 may be formed in its entirety directly in the upper end portion of the casing 10. However, for practical and economical manufacturing reasons, the lower part of said cylinder preferably is comprised by a sleeve 19 inserted downwardly through the open, upper end of the casing 10 into a bore of said casing which it snugly fits, and the upper end portion of said cylinder preferably is formed in a cap 20 which is threaded into and closes the open, upper end of said casing 10.

A wall 21 separates the lower end of the cylinder 16 from the upper or outlet pressure chamber 12, and this wall 21 may, if desired, be formed as an integral bottom wall of the sleeve 19. But, again for practical and economical manufacturing reasons, said wall 21 preferably is formed as a disk separate from said sleeve 19.

The casing 10 is provided with an internal, upwardly facing, annular shoulder 22 upon which the disk 21 rests, and in assembling the valve said disk 21 is inserted in the bore in the upper end of the casing 10 in advance of the sleeve 19 which, at its lower end seats fluid-tightly upon the marginal portion of said disk. The cap 20 then is threaded into the upper end of the casing 10 and serves to hold the sleeve 19 tightly against the disk 21 and the latter tightly against the shoulder 22, a gasket 23 preferably being interposed between the lower end of the cap 20 and the upper end of the sleeve 19 and also between the lower end of said cap and an upwardly facing shoulder of the casing 10 to insure liquid-tight closure of the upper end of the casing 10.

In the upper end of the sleeve 19 is a pair of opposed notches 24, while in the wall of the casing 10 surrounding said sleeve is a pair of ducts 25 which, at their upper ends, communicate with said notches 24, respectively, and, at their lower ends, open into the upper or outlet pressure chamber 12. Thus, communication is afforded between the upper or outlet pressure chamber 12 and the cylinder 16 above the bottom of the latter. Obviously, there may be only a single notch 24 and only a single duct 25 or any desired plurality of such notches and ducts or, if desired, any other suitable means may be provided to afford communication between the chamber 12 and the cylinder 16 above the lower end of the latter.

In and liquid-tightly fitting the lower end portion of the cylinder 16 is a vertically slidable piston 26 which may be of any suitable construction and which is illustrated in the present instance as comprising upper and lower metallic disks 27 and 28, respectively, and a suitable cylinder-engaging packing 29 interposed therebetween. Centrally in the upper disk 27 is a threaded bore 30 into which is tighty threaded the upper end of a stem 31 which extends through a central opening on the lower disk 28 and has an upwardly facing shoulder engaging the lower face of said lower disk. Thus, said stem is firmly secured to the piston 26 for movement therewith and, at the same time, serves to clamp the piston parts together in unitary assembly with each other.

The stem 31 extends downwardly from the piston 26 to a point below the partition wall 18, passing liquid-tightly through a central opening in the wall 21, through the pressure chamber 12, through a central port 32 in the partition wall 13, through the pressure chamber 11 and through a central port 33 in the partition wall 18.

Disposed in the upper pressure chamber 12 for downwardly-closing, upwardly-opening cooperation with a seat surrounding the port 32, to control said port, is a centrally ported ring valve 34 of the poppet type through which the stem 31 extends and which constantly is urged downwardly toward closed position by an expansion helical spring 35 interposed between the same and the wall 21, while cooperating with this ring valve to control the central port 36 therein is a downwardly-closing, upwardly-opening disk valve 37, which is slidably mounted on the stem 31 and which constantly is urged downwardly toward its closed position against the top of said ring valve 34 by an expansion helical spring 38 interposed between the same and the wall 21.

Slidably mounted on the lower end portion of the stem 31 and disposed in the lower or inlet pressure chamber 11 for downwardly-closing, upwardly-opening cooperation with a seat surrounding the port 33, to control said port is a poppet valve 39. Also slidably mounted on the stem 31 between the ring valve 34 and the poppet valve 39 is a masking valve 40 of disk form for cooperation with the underside of said ring valve to control the central port 36 therein.

A suitable abutment 41 on the stem 31 limits upward movement of the masking valve 40 relative to said stem. In addition, suitable upper and lower abutments 42 and 43, respectively, on the lower end portion of said stem, limit upward and downward sliding movements of the poppet valve 39 relative to said stem. Surrounding the stem 31 and interposed between the valves 39 and 40 is an expansion coil spring 44 which tends constantly to urge said valves downwardly and upwardly, respectively.

A duct 45 extends longitudinally through the stem 31 from the upper end thereof to a point between the valves 39, 40 where it is in constant communication with the lower or inlet pressure chamber 11 through a lateral branch 45ª thereof which opens through the side of said stem. Another lateral branch 45ᵇ of said duct opens through the side of said stem directly beneath the piston 26. Thus, the pressure chamber 11 is in constant communication through the duct 45 with the cylinder 16 below the piston 26 and also with the bore 30 in the upper disk 27 of said piston.

Extending upwardly from the upper disk 27 of the piston 26, centrally thereof, is a cylindrical block 46 into which the bore 30 extends and in the outer face of which is an outwardly opening channel 47 which extends partly therearound, while in said block and connecting said bore 30 with one end of said channel 47 is a lateral duct 48.

On the upper end of the block 46 is a disk 49, and between this disk and the top wall 50 of the cap 20 is interposed an expansion helical spring 51 which tends constantly to urge the piston 26 downwardly into the cylinder 16.

Surrounding and snugly engaging the block 46 and rotatable relative thereto is a sleeve valve 52 which is confined between the disk 27 and the marginal portion of the disk 49 which latter extends outwardly beyond the outer face of said block 46, while extending through said sleeve valve is a small opening 53 for movement into and out of registration with the channel 47 by rotation of said valve.

A spiral thermally responsive element 54, which is contractable and expansible in response to variations in temperature to which it is subjected, surrounds the sleeve valve 52 and is suitably secured at one end to said valve, as indicated at 55, and at its other end to the piston 26, as indicated at 56. Accordingly, in response to variations in the temperature to which said thermally responsive element is subjected, the same is effective to rotate the sleeve valve 52 relative to the block 46 to shift the opening 53 into and out of registration with the channel 47 to establish or deny communication between the cylinder 16 above the piston 26 and the lower or inlet pressure chamber 11.

Reverting to Fig. 1 of the drawings, it will be observed that the valve device is interposed in the return side of the lubricant circulating system between the scavenging pump E and the tank B, its inlet opening 14 being connected with the engine A by a conduit a in which the scavenging pump E is interposed, its side outlet opening 15 being directly connected to the tank B in by-passing relationship to the cooler C by a conduit b, and its bottom outlet opening 17 being connected to the tank B by a conduit c in which is interposed the cooler C. It will further be observed that the tank B is connected with the engine A by a lubricant supply conduit d in which the force pump D is interposed. Accordingly, the lubricant, in its circulation from the tank B to the engine A and from the engine back to said tank, will flow either through the conduits a and b in by-passing relationship to the cooler C, or through the conduits a and c and the cooler C, depending upon whether the inlet opening 14 of the valve device F is in communication with the outlet opening 15 or the outlet opening 17 of said valve device.

With the engine idle and no flow taking place thru the lines of the lubrication system, the parts of the valve assembly F assume the positions shown in Fig. 2. Thus, valve 39, controlling communication between the inlet chamber 11 and outlet 17 to the cooler, is closed, as are valves 34 and 37 controlling communication between the chamber 11 and by-pass outlet chamber 12. Piston 26 occupies its lowermost position in the cylinder 16 and so holds valve 40 spaced from its seat on valve 34, while nut 43 on the end of piston rod 31 is spaced from valve 39, the spacing of valve 40 from its seat and the spacing of nut 43 from valve 39 being approximately the same. Piston 26 is urged to its lowermost position by spring 51, which accordingly provides a force, exerted through the respective shoulders 41 and 42 of the piston rod 31, for holding valve 40 normally open and valve 39 normally closed. Spring 44 assists in pressing the valve 39 to closed position, this effect being incidental to the primary purpose of the spring which is to attempt to maintain the valve 40 and valve 39 in engagement with their respective stops 41 and 43.

If the lubricant in the system, in addition to being static, is cold then the thermostat 54 will set the rotary valve 52 to a position placing the port 53 therein in communication with the peripheral groove 47 in block 46; for example, to the position shown in Fig. 3. With the thermal means so arranged a fluid connection is established between inlet chamber 11 and by-pass chamber 12 by way of port 45a in piston rod 31, passage 45, bore 30 in block 46, and the thermally controlled port 48 leading to the interior of cylinder 16 above the piston 26, which space communicates with chamber 12 through ports 24 and passage 25. As a result no opportunity is afforded for any substantial pressure differences to occur in the chambers 11 and 12.

Now, in the event the engine is started with the oil cold and viscous, the positively acting scavenge pump E forces oil to the inlet chamber 11 and raises the pressure therein until it exceeds the back pressure in chamber 12 by an amount sufficient to overcome the light spring 38. Whereupon the valve 37 opens and flow is established between chamber 11 and chamber 12 by way of opening 36 in ring valve 34. It will be noted that the pressure in chamber 11 is exerted on valve 39 in a direction to close the valve so that the entire oil flow is at this time constrained to pass out the by-pass outlet 15 where it acts to warm and expel any congealed oil that may be in the line b. By reason of the energy required to hold valve 37 open against the force of spring 38 there is a pressure drop across the opening 36, which pressure drop tends to be reproduced in the cylinder 16 on opposite sides of the piston 26. Thus, the pressure in chamber 11 is transmitted through port 45a, duct 45 and port 45b to the underside of the piston 26 while the pressure in chamber 12 is conveyed through passages 25 and ports 24 to the topside of the piston 26. However, because the duct 45 further is in communication, by way of bore 30, port 49, annular groove 47 and port 53 in valve 52, with the cylinder space above piston 26 no appreciable pressure difference exists on opposite sides of the piston. It will be understood that while the duct 45 and associated thermally controlled ports directly connect the chambers 11 and 12 the fluid flow therethrough is not sufficient to affect the pressure drop across the opening 36, but only serves to prevent the building up of a greater pressure on one side of the piston 26 than on the other side.

While the oil is heavily viscous and the temperature thereof is well below any value indicating a need for cooling the bleed represented by port 48 remains open. So long as the port 48 is open no operation of the piston 26 can take place and access of the oil to the cooler is denied. In effect, the piston 26 is disabled as an operating means for opening the valve 39. When a rising oil temperature reveals that the oil is flowing and has attained a more fluid state, the thermostat 54 makes response by turning the valve 52 to move the port 53 therein out of communication with the groove 47 and port 48. By this action the cylinder spaces on the opposite sides of the piston 26 are disconnected from each other and are free to exhibit the pressure of their associated chamber 11 or 12. Below the piston is the inlet pressure of chamber 11 and above the piston is the outlet pressure of chamber 12. The function of the piston as a valve operating means thereby is restored.

Following the closing of port 48, therefore, there is established on opposite sides of the piston 26 a pressure difference which will vary in correspondence with changes in the pressure difference between the chambers 11 and 12. The higher pressure being that applied to the underside of the piston, the resultant force of the unbalanced pressures in the cylinder 16 is exerted in a direction to elevate the piston assembly. According to the construction of the parts the pressure difference between inlet chamber 11 and by-pass chamber 12, resulting from the loss of pressure required to hold open valve 37, is sufficient to overcome the spring 51. Accordingly, the piston 26 will rise until the nut 43 on rod 31 abuts against the valve 39. When this occurs the piston assembly encounters additional resistance in the form of fluid pressure in chamber 11 acting downward on valve 39, and this resistance added to that of the spring 51 interrupts the upward movement of the assembly. The travel of the piston assembly to engage the nut 43 with the valve 39 serves also to permit the valve 40 to rise to a seated position on the valve 34 where it closes the opening 36 therein. During movement of the valve 40 to seated position a greater restriction is imposed on the flow of oil from chamber 11 with the result that the pressure therein increases and finally reaches a height sufficient to open the valve 34 against the force of spring 35. To maintain the valve 34 open a greater pressure difference between the chambers 11 and 12 is necessary than is required when only valve 37 is open. This greater difference is reflected in the cylinder 16 by an increase in the resultant force urging the piston 26 upward. A pressure difference is created on opposite sides of the piston 26, which pressure difference is held substantially constant during by-pass flow of the oil since in this period the pressure changes in chambers 11 and 12 occur in unison. The pressure difference between chambers 11 and 12 remains substantially constant against flow variation and temperature change. Flow variation changes the pressure difference only because of the modified deflection of spring 35, and the effect so attained is slight. As to the effect of temperature change on the pressure difference, it will be observed that the flow around valve 34 is flow through an annular orifice and therefore is not affected to any appreciable extent by changes in viscosity of the flowing fluid. The pressure difference across piston 26, resulting from the loss of pressure required to hold open valve 34, is not at once effective further to raise the piston 26 since such motion is resisted by a pressure acting downward on the valve 39. The arrangement is such, however, that while the pressure difference on opposite sides of the piston 26 is constant, the pressure acting directly downward on valve 39 (inlet pressure) is variable. Thus, when the oil is cold its viscosity, and therefore its resistance to flow, are at a high level and the pressure in chamber 11, is correspondingly high. As the oil is warmed by operation of the engine, its viscosity is lowered and its resistance to flow becomes less, resulting in a general falling off of pressure in the system. In the chamber 11 such falling off of pressure is reflected in a decrease in the pressure urging valve 39 closed. A similar decrease in pressure takes place in the cylinder 16 on each side of the piston 26 but due to the maintenance of the constant pressure differential in the cylinder the resultant force attempting to open the valve 39 is unchanged. At a predetermined point in the range of dropping pressures the inlet pressure acting on valve 39 becomes inadequate to the task of holding the valve closed against the urging of the resultant force in cylinder 16, and at this point the piston 26 rises and lifts the valve to open position. The oil stream then is free to discharge through outlet 17 and pass to the cooler. Following opening of valve 39, the valve unit comprising valves 37, 34 and 40 may close although a slight flow of oil through the by-pass is permitted by ports 57 in order that some motion of oil may be had in the line b.

The parts will remain so positioned until the engine is shut off, allowing the piston 26 to descend and condition the valve for a new cycle of operation.

It is a purpose of the surge valve to prevent the delivery of oil to the cooler, during the period of engine starting and warmup, at a pressure above a predetermined safe level. In one commercial embodiment of the valve it is adapted for use in conjunction with a cooler wherein it is desired to limit the maximum oil pressure to eighty pounds per square inch. In that valve, and assuming a back pressure of thirty pounds in the line b, the valve 34 is set to open when a difference of approximately fifty pounds pressure exists between the chambers 11 and 12. Thus a minimum of eighty pounds pressure is required at the surge valve inlet 11 to maintain flow through the by-pass b. During the period of engine starting and warmup, as long as the inlet pressure is above eighty pounds the cooler control valve 39 is held closed and the oil stream is compelled to follow the by-pass b. As the pressure drops below eighty pounds valve 39 is lifted from its seat and the path to the cooler opened.

From the foregoing description, considered in connection with the accompanying drawings, it is believed that the construction and operation of the instant valve will be clearly understood and its advantages appreciated. It is desired to point out, however, that while only a single specific structural embodiment of the invention has been illustrated and described, the same is readily capable of embodiment in various specifically different structures within its spirit and scope as defined in the appended claims.

I claim:

1. A valve device to control the path of flow of a viscous liquid of varying temperature, said valve device including a casing having an inlet opening and main and by-pass outlet openings, a normally closed valve controlling flow of liquid from said inlet opening to said main outlet opening, yieldably closed valve means closing toward said inlet opening and controlling flow of liquid from said inlet opening to said by-pass outlet opening, liquid pressure operated means operable to maintain said normally closed valve closed as long as the pressure of the liquid in said inlet opening exceeds a predetermined value and to open said normally closed valve when the pressure in said inlet opening is reduced to said predetermined value, and thermally responsive means operable by the temperature of the liquid to prevent operation of said liquid pressure operated means to open said normally closed valve as long as the temperature of the liquid remains below a predetermined degree.

2. A valve device to control the path of flow of a viscous liquid of varying temperature, said valve device including a casing having an inlet opening and main and by-pass outlet openings, a normally closed valve controlling flow of liquid from said inlet opening to said main outlet opening and urged to closed position by the liquid pressure at the inlet, yieldably closed valve means closing toward said inlet opening and controlling flow of liquid from said inlet opening to said by-pass outlet opening, means operable in response to difference in pressure of the liquid in said inlet opening and said by-pass outlet opening to maintain said normally closed valve closed as long as the pressure of the liquid in said inlet opening exceeds a predetermined value and to open said normally closed valve when the pressure in said inlet opening is reduced to said predetermined value, and thermally responsive means operable by the temperature of the liquid to prevent operation of said differential pressure operated means to open said normally closed valve as long as the temperature of the liquid remains below a predetermined degree.

3. A valve device to control the path of flow of a viscous liquid of varying temperature, said valve device including a casing having an inlet opening and main and by-pass outlet openings, a normally closed valve controlling flow of liquid from said inlet opening to said main outlet opening and urged to closed position by the liquid pressure at the inlet, yieldably closed valve means closing toward said inlet opening and controlling flow of liquid from said inlet opening to said by-pass outlet opening, cylinder and piston means the piston of which is connected to said normally closed valve and one end of the cylinder of which is in communication with said inlet opening and the other end of the cylinder of which is in communication with said by-pass outlet opening whereby the piston is operable by difference in presure of the liquid in said inlet opening and said by-pass outlet opening to maintain said normally closed valve closed as long as the pressure of the liquid in said inlet opening exceeds a predetermined value and to open said normally closed valve when the pressure in said inlet opening is reduced to said predetermined value, and means including a thermally controlled valve operable by the temperature of the liquid to establish communication between said inlet opening and the second mentioned end of said cylinder when the temperature of the liquid is below a predetermined degree and to deny communication between said inlet opening and the said second mentioned end of said cylinder when the temperature of the liquid is at or above said predetermined degree, thus to prevent differential pressure operation of said piston to open said normally closed valve as long as the temperature of the liquid remains below said predetermined degree.

4. A valve device to control the path of flow of a viscous liquid of varying temperature, said valve device including a casing having an inlet opening and main and by-pass outlet openings, a normally closed valve controlling flow of liquid from said inlet opening to said main outlet opening and urged to closed position by the liquid pressure at the inlet, yieldably closed valve means closing toward said inlet opening and controlling flow of liquid from said inlet opening to said by-pass outlet opening, a cylinder, a piston reciprocable therein, a stem connecting said normally closed valve to said piston and having therein a duct providing communication between said inlet opening and one end of said cylinder, means providing communication between the by-pass opening and the other end of said cylinder whereby the piston is operable by difference in pressure of the liquid in said inlet opening and said by-pass outlet opening to maintain said normally closed valve closed as long as the pressure of the liquid in said inlet opening exceeds a predetermined value and to open said normally closed valve when the pressure in said inlet opening is reduced to said predetermined value, and thermally responsive means operable by the temperature of the liquid to prevent differential pressure operation of said piston to open said normally closed valve as long as the temperature of the liquid remains below a predetermined degree, said thermally responsive means comprising a rotary valve carried by the piston and controlling communication through the duct in said stem between said inlet opening and the second mentioned end of said cylinder, and a thermal element also carried by said piston and operable to rotate said valve to an open position when the temperature of the liquid is below a predetermined degree and to a closed position when the temperature of the liquid is at or above said predetermined degree.

5. A valve device to control the path of flow of a viscous liquid of varying temperature, said valve device including a casing having an inlet opening and main and by-pass outlet openings, a normally closed valve controlling flow of liquid from said inlet opening to said main outlet opening and urged to closed position by the liquid pressure at the inlet, yieldably closed valve means closing toward said inlet opening and controlling flow of liquid from said inlet opening to said by-pass outlet opening, a cylinder, a piston reciprocable therein, a stem connecting said normally closed valve to said piston and having therein a duct providing communication between said inlet opening and one end of said cylinder, means providing communication between the by-pass opening and the other end of said cylinder whereby the piston is operable by difference in pressure of the liquid in said inlet opening and said by-pass outlet opening to maintain said normally closed valve closed as long as the pressure of the liquid in said inlet opening exceeds a predetermined value and to open said normally closed valve when the pressure in said inlet opening is reduced to said predetermined value, and thermally responsive means operable by the temperature of the liquid to prevent differential pressure operation of said piston to open said normally closed valve as long as the temperature of the liquid remains below a predetermined degree, said thermally responsive means comprising a cylindrical block carried by the piston and having therein and opening through the side thereof a duct communicating with the duct in said stem, a sleeve valve rotatable on said block and having therein an opening to establish and deny communication through said ducts between the inlet opening and the second mentioned end of said cylinder, and a coiled thermal element connected at one end to said sleeve valve and at its other end to said piston and operable by a temperature of the liquid below a predetermined degree to rotate said sleeve valve to an open position and by a temperature of the liquid above said predetermined degree to rotate said sleeve valve to a closed position.

6. A valve device to control the path of flow of a viscous liquid of varying temperature, said valve device comprising a casing having a lower inlet chamber and a side inlet opening communicating therewith, an upper by-pass outlet chamber and a side outlet opening communicating therewith, a vertically disposed cylinder above said by-pass outlet chamber, and a bottom outlet opening below said inlet chamber, an upwardly opening downwardly closing normally closed poppet type valve controlling flow of liquid from said inlet chamber to said bottom outlet opening, a piston reciprocable in said cylinder, a stem connecting said piston and said poppet type valve, said stem having a duct therein providing communication between said inlet chamber and the bottom of said cylinder and said by-pass chamber being in communication with the upper end of said cylinder whereby a greater pressure in said inlet chamber and in said cylinder below said piston than in said outlet chamber and in said cylinder above said piston is effective to raise said piston and stem and open said poppet type valve, upwardly opening downwardly closing normally closed poppet type valve means controlling flow of liquid from said inlet chamber to said by-pass outlet chamber, spring means of predetermined strength tending constantly to close said valve means so that upon the pressure of the liquid in said inlet chamber exceeding a predetermined value said valve means opens to real relieve the pressure and closes when the pressure is reduced to said predetermined value, a cylindrical block carried by and rising from said piston and having therein a duct which opens through the side thereof and which is in communication with the duct in said stem, a rotary sleeve valve on said block having an opening therein and operable by rotation thereof to establish and deny communication through said ducts between said inlet chamber and the top of said cylinder, and a coiled thermal element connected at one end to said sleeve valve and at its other end to said piston and operable by a temperature of the liquid at or above a predetermined degree to rotate said sleeve valve to a closed position denying communication between said inlet chamber and the top of said cylinder and by a temperature of the liquid below said predetermined degree to rotate said sleeve valve to an open position establishing communication between said inlet chamber and the top of said piston, whereby the top of the cylinder is subjected to the pressure in the inlet chamber and the piston is prevented from rising and opening the valve controlling flow from the inlet chamber to the bottom outlet opening as long as the temperature of the liquid is below said predetermined degree.

7. A flow control device for a fluid of variable pressure and temperature, comprising a housing having a fluid inlet, an outlet and a by-pass, all of which are connected, a valve between said inlet and said outlet moveable to open and closed positions to control the flow of fluid from said outlet, pressure responsive means including a piston reciprocable within a piston chamber to operate said valve, means for establishing a pressure differential in said piston chamber on opposite sides of said piston, the resultant force of which is exerted in a direction to effect opening of said valve, a fluid passage connecting the ends of said piston chamber on opposite sides of said piston, said passage acting when open to prevent the building of a greater pressure per unit area on one side of the piston than on the other side thereof, and thermally controlled means for opening and closing said fluid passage in response to variations in fluid temperature below and above a predetermined value.

8. A flow control device for a fluid of variable pressure and temperature, comprising a housing having a fluid inlet, an outlet and a by-pass, all of which are connected, a valve between said inlet and said outlet moveable to open and closed positions to control the flow of fluid from said outlet, pressure responsive means for operating said valve, means for applying a constant pressure to said pressure responsive means in a direction to open said valve, means exerting a pressure tending to close said valve, the pressure of said last named means varying with variations in the fluid pressure at said inlet whereby said valve is held closed when said inlet pressure exceeds said constant pressure and is permitted to open when said inlet pressure drops below said constant pressure, and temperature responsive means for disabling said constant pressure applying means within a predetermined range of fluid temperatures.

9. A flow control device for a fluid of variable pressure and temperature, comprising a housing having a fluid inlet, an outlet and a by-pass, all of which are connected; a valve movable by the pressure of the fluid at said inlet to close said outlet; means establishing a pressure differential between said inlet and by-pass; means responsive to said pressure differential for opening said valve, said means acting to open said valve when the opposing pressure at said inlet drops to a predetermined value; and temperature responsive means for disabling said pressure differential responsive means as long as the fluid temperature is below a predetermined value.

HARRY T. BOOTH.